United States Patent [19]

Busch et al.

[11] Patent Number: 5,064,534

[45] Date of Patent: Nov. 12, 1991

[54] FILTER FOR THE PURIFICATION OF TAP WATER

[76] Inventors: Erich Busch, Walkmühlstrasse 11, 6204; Michael Busch, Walkmühlstrasse 11, 6294, both of Taunusstein 4, Fed. Rep. of Germany

[21] Appl. No.: 74,876

[22] Filed: Jul. 17, 1987

[30] Foreign Application Priority Data

Jul. 18, 1986 [DE] Fed. Rep. of Germany ....... 3624414

[51] Int. Cl.⁵ ............................................. C02F 9/00
[52] U.S. Cl. .................................. 210/266; 210/501; 210/502.1; 210/504; 210/510.1
[58] Field of Search ............... 210/266, 282, 283, 290, 210/501, 502.1, 504, 506, 510.1, 284

[56] References Cited

U.S. PATENT DOCUMENTS 3,327,859  6/1967  Pall .................................. 210/502.1
4,664,683  5/1987  Degen et al. .................... 210/502.1

Primary Examiner—Ivars Cintins
Attorney, Agent, or Firm—Schwartz & Weinrieb

[57] ABSTRACT

A filter for the purification of tap water containing several layers of different filter materials. One of the layers is an adsorption filter element comprising a self-supporting sintered body of finely dispersed adsorption material, e.g., activated charcoal, a thermoplastic binder material and a finely dispersed, oligodynamic material, wherein these materials provide a fine-mesh, mechanical filter. The adsorption filter can also be used by itself for filtering purposes.

16 Claims, 3 Drawing Sheets

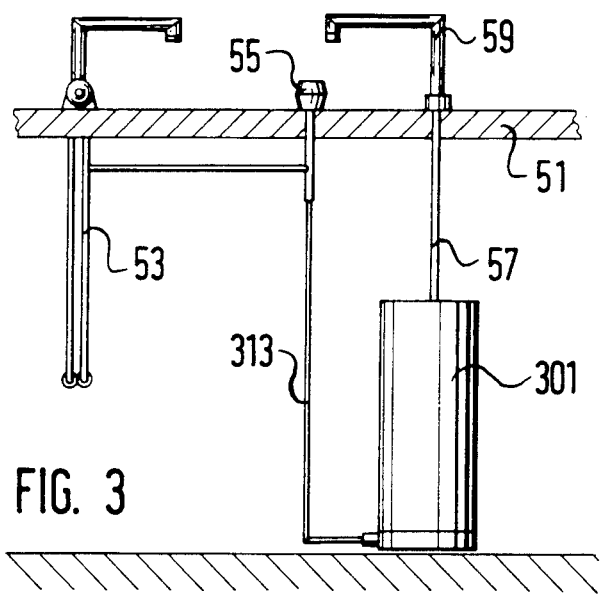
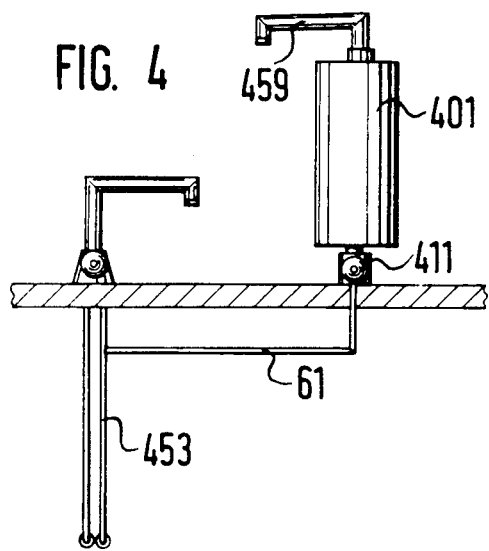
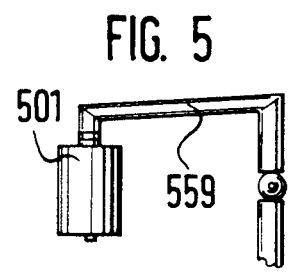
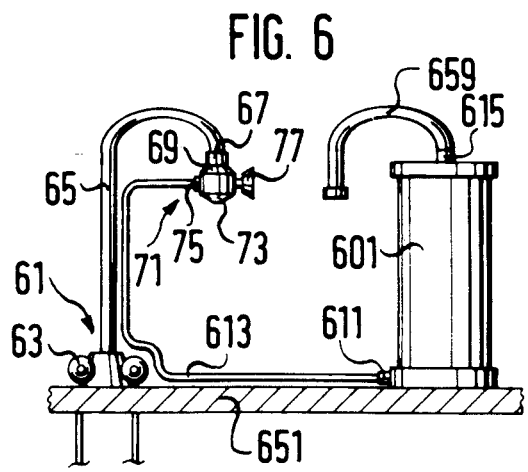

FILTER FOR THE PURIFICATION OF TAP WATER

This invention relates to a filter for the purification of tap water and more particularly, for a household water tap connection.

BACKGROUND OF THE INVENTION

Tap water, in particular, from household water taps, is often of an unsatisfactory quality. This is particularly true for water treated in water treatment plants, which is normally bacteria-free, as well as for the water from private wells. In particular, complaints are often made about the water being excessively hard, having a disagreeable taste and/or having the smell of chlorine or organic impurities, especially phenol.

Many filters, suitable for connection to household water taps have been proposed. Many of these filters, in the form of filter cartridges, contain a combination of different filtering materials designed to eliminate particular objections to the tap water being filtered Since a number of objections, which are generally different in nature, are to be eliminated from a given source of tap water, a corresponding number of different filter materials is therefore required. However, difficulties arise in placing the different filter materials into a filter intended for household use so that operation of the same is not rendered difficult and a satisfactory and useful life are achieved. In particular, the changing of filter materials for private households is too cumbersome and takes too much time. Therefore, it is known to provide filter materials in the form of easily exchangeable filter cartridges. However, these filter cartridges require additional structural effort and space since, as a rule, they are designed for enveloping loosely inserted filter materials. An example of such a filter cartridge is disclosed in U.S. Pat. No. 2,959,290. According to this patent, a ceramic filter element is preferably used for mechanical filtering. Additionally, other filtering operations are performed by a granular mixture of an ion-exchange resin, an adsorption substance and substances for combating bacteria. Regeneration of such a filter is quite difficult. The ceramic filter elements are expensive and require alot of space.

In general, the production of satisfactory filters for household use has not, as of yet, been achieved.

OBJECTS OF THE INVENTION

It is therefore a primary object of the present invention to provide a filter for the purification of tap water, especially for a household water tap, exhibiting a long service life while being of acceptable dimensions, inexpensive to manufacture, capable of being easily installed and capable of operating with a high degree of efficiency.

A further object of the present invention is the provision of a self-supporting filter body that is inexpensive to manufacture.

Still another object of the present invention is the provision of an adsorption filter element that is capable of adsorbing odors, contaminants, chemicals, etc., generally present in tap water.

SUMMARY OF THE INVENTION

In order to achieve the objectives of this invention, a filter cartridge for the purification of tap water is provided, having a plurality of layers of different filter materials, each being successively disposed in the direction of flow of tap water through the filter device or cartridge and purifying the tap water by mechanical filter action, the action of an ion-exchange material and adsorption by an adsorption substance, such as, for example, activated charcoal, preferably in the presence of an oligodynamic substance, such as, for example, silver or a silver compound that is only slightly soluble in water and that functions to prevent the formation of bacteria, and at least one layer being formed by an adsorption filter element.

In accordance with this invention, the adsorption filter element which is useful in said filter cartridge or by itself, comprises a self-supporting, sintered body of a finely distributed adsorption substance, a thermoplastic binder material, and a finely distributed, oligodynamic substance, in the form of a mechanical, fine-mesh filter.

Most of the important filter functions for household tap water are thus combined into a single, self-supporting, cheap to manufacture, filter element which, by itself, serves as a filter device that is capable of filtering household tap water but it is preferred to use this element in combination with other filtering elements, such as in the form of a cartridge, as discussed herein. Since a thermoplastic binder material is employed in the manufacture of the adsorption filter element, only a small amount of apparatus is required for the production of the filter element, at a low cost. Moreover, it is easily possible to obtain a particular desired fineness of the filter element by varying the grain size and amounts of materials employed for the sintering operation, as well as variations in the sintering parameters. Thus, it is possible, in particular, to produce an adsorption filter element in accordance with the invention, such that it will separate particles that are greater than about 0.5 $\mu$m and also function as a bacterial filter.

DETAILED DESCRIPTION OF THE INVENTION

Figure 1:
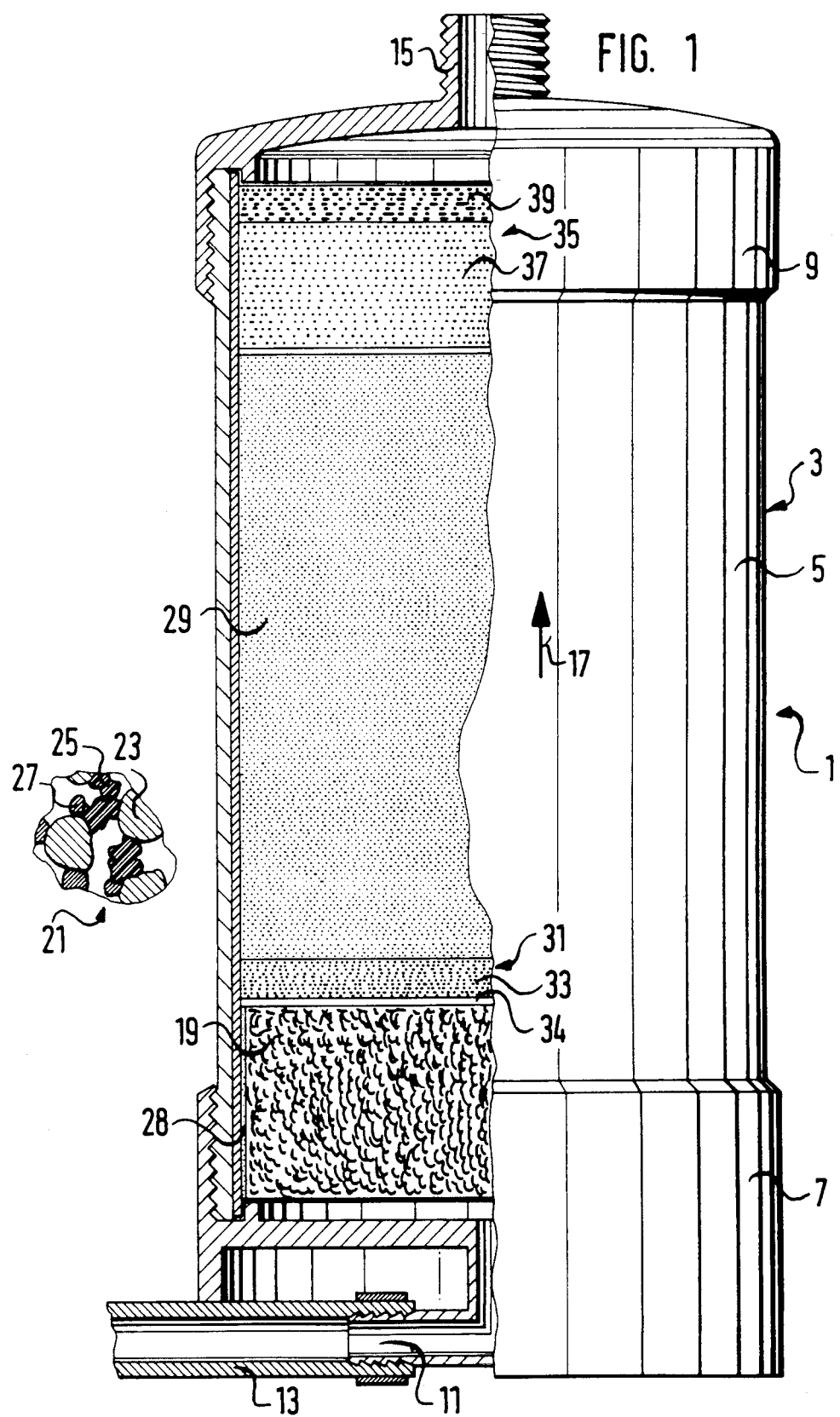
Figure 2:
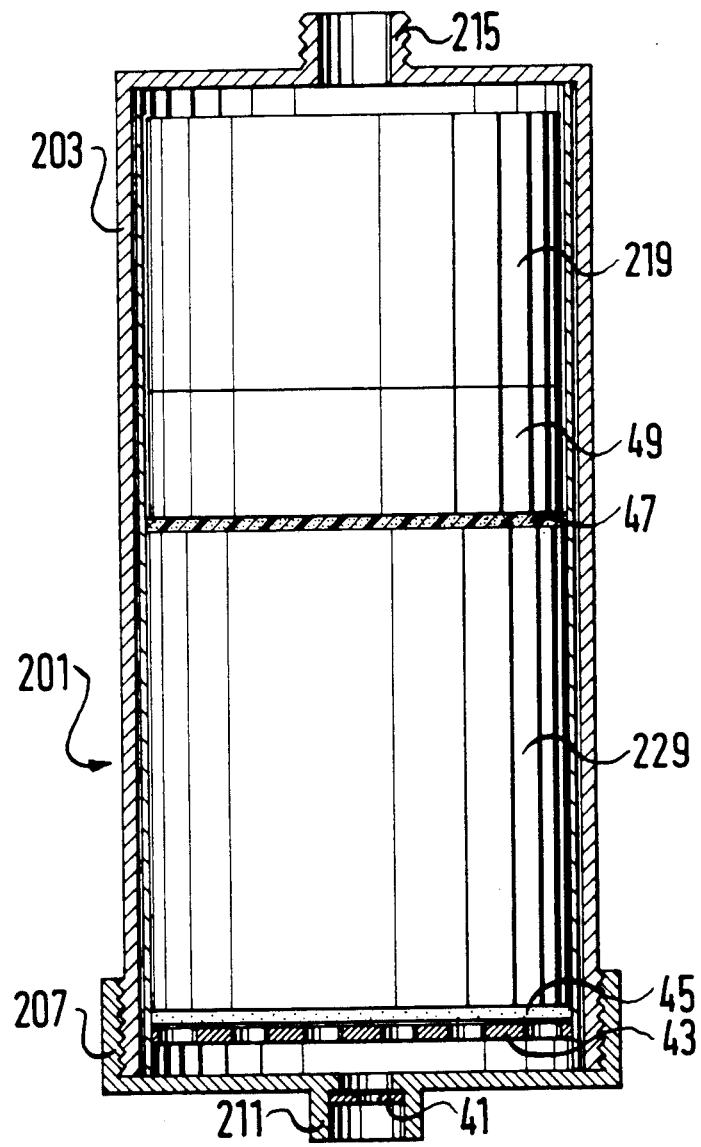

The present invention is described, in detail, by making reference to the preferred embodiments illustrated in the drawings. Briefly, FIG. 1 is a schematic view of a filter, illustrated in partial cross section, in accordance with this invention;

FIG. 2 is a schematic view, in axial section, of another illustrative embodiment of the filter in accordance with this invention; and FIGS. 3 to 6 schematically illustrate further embodiments of the present invention for connection Of the filter to sources of tap water.

In FIGS. 2 to 6, parts shown in the same manner in a previous figure, have been given the same reference numerals, but are provided with a prefix giving the number of the particular figure.

FIG. 1 shows a filter 1 having a cylindrical filter housing 3 consisting of a center piece 5 and first end piece 7 and second end piece 9 which can be screwed onto center piece 5. The first end piece 7 forms an input element provided with an input connection means or connector 11; a household water tap, not shown, can be connected to said first end piece 7, for example by means of a pressure hose 13. The second end piece 9 has an output connection means or connector 15 with threads for a piece of plumbing, for example, an outlet pipe. It is to be understood that all parts used in the practice of this invention are to be constructed with materials such that they can withstand the water pressures occurring during operation. In most cases, it may be practical to provide a shut-off valve upstream of the pressure hose 13.

The filter element or cartridge illustrated in FIG. 1, contains, in the direction of the flow of water 17, in succession, first an adsorption filter element 19 consisting of a self-supported sintered body. The structure of the sintered body is illustrated in the schematically enlarged partial cross-section 21. particles 23 of a finely dispersed adsorption material, e.g., activated charcoal, are contained by nodular particles 25 which is a thermoplastic binder material., polyethylene. A finely dispersed, oligodynamic material, e.g., silver particles 27, are also present.

In the embodiment illustrated in FIG. 1, the adsorption filter element 19 is fastened across its entire mantle surface in a pressure-proof and sealing manner within the filter housing 3, by means of a sealing cement 28, which extends across the mantle of the filter element or cartridge. To make cementing easier, adsorption filter element 19 can be subdivided into several shorter, partial elements, in the direction of flow 17, if preferred. Thus, a plurality of adsorption filter elements can be employed as a substitute for a single adsorption filter element provided that the sum of the thicknesses of each element approximates the thickness of the single element.

Downstream of the adsorption filter element 19, ion-exchange filter material 29 is provided. This element preferably consists of a hydrogen ion-exchange material that serves as a water softener by removing carbonates from the water. Useful hydrogen ion-exchange materials for this purpose are well known to those of ordinary skill in the art.

It is preferred that the ion-exchange filter material be positioned downstream of the adsorption filter element 19 in the filter according to the invention. In this way, contamination of the ion-exchange material 29, which can be used repeatedly, is avoided.

A bacteria arresting zone 31 may optionally be included in the cartridge and is preferably located between the adsorption filter element 19 and the ion-exchange material 29 in order to provide a greater antibacterial effect than adsorption filter element 19, by itself, and also to prevent further passage of bacteria through the filter cartridge that was introduced into said cartridge at the input end. In the example illustrated, bacteria arresting zone 31 contains a bacteria filter 33 in the form of a block of activated charcoal constructed in a manner similar to adsorption filter element 19, but exhibiting a finer porosity, in particular at least as small as 0.2 μm and having a metallic silver powder embedded and dispersed therein. In the embodiment shown, and according to a preferred embodiment of the present invention, the bacteria arresting zone 31 further contains an oligodynamic layer 34 upstream of the bacteria filter in the form of a thin layer of a granulate having a high content of an oligodynamic material, preferably silver or a silver compound, as discussed hereinbefore. Particulate silver has a long useful life in most types of tap water and is therefore preferred. In this manner, an effective control of bacteria is assured in the input area of bacteria filter 33.

A post-adsorption zone 35 is also preferably provided in the area towards the end of the flow path of said tap water, through said filter cartridge. In the embodiment illustrated, the post-adsorption zone 35 contains both a post-adsorption filter layer 37 and a disc of pressed coal 39. This zone functions so as to avoid changes in water taste possibly arising from the ion-exchange material, particularly after prolonged use of the same.

Since an adsorption effect is more important at this stage of the filtering process, the post-adsorption filter layer 37 normally may have larger pores and thereby offer less resistance to the flow of tap water therethrough. Therefore, this layer can simply be formed by a poured layer of activated charcoal resulting in the formation of a post-adsorption layer 37 of a grainy activated charcoal having a grain size between about 0.6 to 1.2 mm.

At the end of the post-adsorption zone 35, a disc 39 of pressed coal is disposed. This disc is sufficiently sturdy such that its surface can be in direct contact with the screwed-on second end piece 9. In the embodiment shown, grains of silver or other oligodynamic material are embedded into the pressed coal disc in an amount sufficient to counteract possible bacterial growth emanating from the clean water side of the filter. Generally, said oligodynamic material is present in an amount between 0.2 and 0.5 percent by volume of the total post-adsorption pressed coal filter.

FIG. 2 illustrates a filter useful for the purification of tap water from polluting matter as well as for the removal of carbonates and bacteria from tap water, in a single operation. Several filter layers are placed on the top of each other, in a filter cartridge such that five different layers are illustrated. Each layer present contributes a part of the total filtering process such that a silver-containing plastic filter element provides for the elimination of bacteria possibly present in the water and thereby additionally prevents bacterial growth on the inside of the filter cartridge. An ion-exchanger removes the carbonates from the water. After flowing through the ion-exchange material, the filtered water has been completely softerend. Adsorption of many contaminants, especially chlorine, is accomplished by passage of the water through the activated charcoal. A block of coal eliminates organic materials, odor, taste and discoloration of the water. Also, all chemicals having a particle size greater than 1 μm and preferably greater than 0.5 μm are filtered out of the water.

With reference to the specific details of the embodiment illustrated in FIG. 2, the filter cartridge 201 contains a cylindrical filter housing 203 wherein one of its ends can be opened by a screw cap 207 provided therein. On this end of the filter housing, a connecting piece 211 is provided through which the tap water to be filtered is admitted. A single-hole disc 41 is provided to restrict the amount of flow of water. The water is pushed into the ion-exchange material 229 through a perforated distributor disc.43 by the line pressure and is distributed evenly. A coarse filter disc 45 has been provided between the distributor disc 43 and the ion-exchange material 229. Water first passes through the coarse filter disc 45 and then through the ion exchange material 229. The water then continues to flow through a filter disc 47. Filter disc 47 consists of a porous plastic material covered with silver. Water then flows through a layer 49 of granulated silver and activated charcoal and then finally through an adsorption filter element 219 of the type as defined with respect to the filter cartridge illustrated in FIG. 1. After passage through adsorption filter element 219, the filtered tap water flows out of the filter cartridge through a connecting piece 215.

FIG. 3 illustrates a further embodiment of the present invention wherein filter cartridge 301 is located underneath a sink 51. The water is supplied by a connection by means of a tee provided at the cold water supply line 53 of the sink plumbing. The tee is connected by means of an appliance connector valve 55 and a plastic hose 313 with the filter cartridge 301. Flow-off of the filtered water takes place through a faucet 59 by means of plastic hose 57.

FIG. 4 illustrates a still further embodiment of the present invention wherein filter 401, with faucet 459, is provided on a supply pipe 411 which is screwed onto connecting pipe 61 which represents a supply line from water line 453.

FIG. 5 illustrates another embodiment wherein filter 501 is screwed onto an existing faucet 559 for the treatment of the water passing therethrough.

FIG. 6 illustrates an embodiment wherein the filter 601 is attached to a sink 651. A discharge pipe 659 is connected to the outlet connector 615. Customary outlet plumbing 61, with a mixer 63, and an outlet pipe 65 has been provided. The inlet 69 of a two-way valve 71 has been screwed to the output end 67 of the outlet pipe 65. The two-way valve 71 has a downwardly directed first outlet 73, a lateral second outlet 75 and a switch button 77 changeable between two switch positions. The second outlet 73 is connected to the inlet connector 611 of the filter 601 by means of a pressure hose 613. In the first switching position of switch button 77, the outlet pipe 65 is connected with the first outlet 73 of the two-way valve 71. Tap water can be drawn off in the usual way. In the second switch position of switch button 77, the output pipe 65 is connected to the pressure hose 613 by means of the second outlet 75. Filtered water can then be drawn from the outlet pipe 659 of the filter 601.

It has been shown that the characteristics of the adsorption filter element employed in the various embodiments of the present invention can be designed in a particularly advantageous manner if this filter element has finely dispersed particles of a thermoplastic binder material, generally having a nodular form in contrast to a globular form, the binder material being of a type exhibiting a viscous elasticity in a temperature transition zone during heating, but becoming sufficiently sticky on the surface so as to bond the particles present in the adsorption element. It has been shown that it is possible with such a construction of the adsorption filter element to combine a high degree of fineness (or porosity) of the filter with a comparatively low resistance to the flow of water therethrough. The nodular thermoplastic binder material particles preferably consist essentially of polyethylene of a very high molecular weight. A low pressure polyethylene having a molecular weight in the range of between 3 to $7 \times 10^6$ is particularly preferred. Such a binder exhibits favorable chemical and mechanical properties and has no ill effects on health. Moreover, such materials can be obtained at a low cost.

As discussed hereinbefore, both an oligodynamic material and activated charcoal are used in combination with the thermoplastic binder which is employed as an adsorption filter element, in its sintered form. Generally, the volume ration of the thermoplastic material to activated charcoal is in the range of between 3:7 and 7:3. The oligodynamic material is present in said sintered mixture in an effective amount and generally between about 0.2 and 0.5 percent by volume.

The oligodynamic material is a powdery material having a preferred particle size between about 1 to 120 $\mu$m, although particles greater than 120 $\mu$m can be employed in such a mixture. Suitable oligodynamic materials for this and other applications in the filter cartridge of this invention, include particles of silver and silver compounds, the latter being only very slightly soluble in water. Examples of suitable silver compounds includes, for example, silver sulfide and silver chloride. Copper is also believed to be useful as an oligodynamic material in the practice of this invention.

The sintered adsorption filter element of the present invention is preferably prepared by forming a mixture of the polyethylene, activated charcoal and oligodynamic material, in the amounts of each ingredient defined hereinbefore. The mixture is filled into a metallic form or mold containing applyable disks to subject the mixture to a pressing step. Air is withdrawn from the forms or molds and the mixture is then sintered at a temperature of from 200° C. to 300° C., for about 30 to 90 minutes. The actual time varies in accordance with the thickness of the filter element, a greater time period being required for thicker elements.

A further pressing step can take place, if necessary, either during the sintering step or subsequent to sintering (the element must have a temperature of from 200° C. to 300° C.). The applied pressure is in the range of 7 to 30 bar. The filter elements can be used in the practice of this invention once they have been allowed to cool.

What is claimed is:

1. A filter useful for the purification of tap water, having a filter housing, a plurality of layers of different filter materials disposed successively in the direction of flow for the purification of the tap water by mechanical filter action and comprising an ion-exchange material, adsorption in an adsorption material and at least one layer being formed by an adsorption filter element, wherein said adsorption filter element consists of a compressed, self-supporting, sintered body of finely dispersed adsorption material, a finely dispersed oligodynamic material and a thermoplastic binder material, wherein said binder material is polyethylene having a molecular weight in the range of 3 to $7 \times 10^6$, in the form of particles having a nodular shape and exhibiting viscous elastic properties in a transitional temperature range during heating and being sufficiently sticky on the surface to form a bond with the particles present in the adsorption material, and said adsorption filter element being a mechanical, fine-mesh filter for said tap water.

2. A filter in accordance with claim 1, wherein said adsorption filter element is of a mesh size sufficient for trapping contaminating particles having a size greater than approximately 0.5 $\mu$m.

3. A filter in accordance with claim 1, wherein said adsorption filter element is fastened onto the filter housing in a pressure-proof and sealing manner by means of a sealing cement extending over the surface of said filter housing.

4. A filter in accordance with claim 3 wherein said ion-exchange material is downstream from the adsorption filter element.

5. A filter in accordance with claim 4 wherein said ion-exchange material consists of a hydrogen ion-exchange material.

6. A filter in accordance with claim 5 further comprising a bacteria arresting means disposed between said adsorption filter element and said ion-exchange material.

7. A filter in accordance with claim 6 wherein said bacteria arresting means contains a bacteria filter.

8. A filter in accordance with claim 7 wherein said bacteria filter is a fine-mesh block of pressed coal having an oligodynamic material dispersed in said pressed coal.

9. A filter in accordance with claim 8 wherein said bacteria arresting means further comprises oligodynamic layer disposed upstream of said bacteria filter.

10. A filter in accordance with claim 9 further comprising a post-adsorption means disposed at the end of the flow path of said water through said filter.

11. A filter in accordance with claim 10 wherein said post-adsorption means has a post-adsorption filter layer.

12. A filter in accordance with claim 11 wherein said post-adsorption filter layer is a poured layer of activated charcoal.

13. A filter in accordance with claim 11 wherein said post-adsorption means has a disc of pressed coal disposed at the end of the flow path of said water.

14. A filter in accordance with claim 13 wherein said pressed coal layer contains an oligodynamic material.

15. A filter in accordance with claim 14 wherein said oligodynamic material is silver powder.

16. A filter in accordance with claim 1 wherein said adsorption filter element is subdivided into several individual bodies wherein the length of each body in the direction of flow is less than the total length of said entire adsorption filter element.

* * * * *